United States Patent
Adachi et al.

(10) Patent No.: US 12,001,325 B2
(45) Date of Patent: Jun. 4, 2024

(54) TEST DATA GENERATION APPARATUS, TEST DATA GENERATION METHOD AND PROGRAM

(71) Applicant: NIPPON TELEGRAPH AND TELEPHONE CORPORATION, Tokyo (JP)

(72) Inventors: Yu Adachi, Tokyo (JP); Haruto Tanno, Tokyo (JP); Yu Yoshimura, Tokyo (JP); Hiroyuki Kirinuki, Tokyo (JP); Toshiyuki Kurabayashi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 198 days.

(21) Appl. No.: 17/777,959

(22) PCT Filed: Nov. 20, 2019

(86) PCT No.: PCT/JP2019/045490
§ 371 (c)(1),
(2) Date: May 18, 2022

(87) PCT Pub. No.: WO2021/100156
PCT Pub. Date: May 27, 2021

(65) Prior Publication Data
US 2022/0350730 A1 Nov. 3, 2022

(51) Int. Cl.
*G06F 11/36* (2006.01)
(52) U.S. Cl.
CPC ...... *G06F 11/3684* (2013.01); *G06F 11/3692* (2013.01)

(58) Field of Classification Search
CPC ...................................................... G06F 11/36
See application file for complete search history.

(56) References Cited

U.S. PATENT DOCUMENTS 9,146,829 B1* 9/2015 Allen .................. G06F 11/3684
9,465,942 B1* 10/2016 Kane-Parry .......... G06F 21/125
(Continued)

OTHER PUBLICATIONS

Webrage Co., Ltd. (2019) "Experience-based testing techniques" literature, [online] Accessed on Nov. 11, 2019, website: https://webrage.jp/techblog/testing_by_experience/.

*Primary Examiner* — Jae U Jeon

(57) ABSTRACT

A test data generation device that generates test data to be input into an input field of a test target application includes a storage unit that stores a tacit knowledge test data dictionary including, for each tacit knowledge category, a generation method, test data information, and an input value constraint on an input field to be used as a generation condition, and a generation unit that refers to, regarding a certain tacit knowledge category for a target input field, the tacit knowledge test data dictionary to generate test data for the target input field when an input value constraint of the target input field in the test target application and an input value constraint of a generation condition regarding the tacit knowledge category are determined to match, and not to generate the test data for the target input field when the input value constraint of the target input field and the input value constraint of the generation condition regarding the tacit knowledge category are determined not to match.

18 Claims, 10 Drawing Sheets

(56) References Cited

U.S. PATENT DOCUMENTS

2008/0183692 A1\* 7/2008 Jackson ................. G06F 16/90
                                                              707/999.005
2012/0116561 A1\* 5/2012 Nakagawa ......... G05B 19/0426
                                                              700/97

\* cited by examiner

Fig. 2

| No. | TACIT KNOWLEDGE CATEGORY | CHECK VIEWPOINT |
|---|---|---|
| 1 | PLATFORM-DEPENDENT CHARACTER | WHETHER CHARACTERS WILL NOT BE GARBLED ON SCREEN, DATABASE, AUTOMATED REPLY, OR LIKE |
| 2 | VARIATION OF DATE FORMAT | WHETHER PRESENCE OR ABSENCE OF ZERO PADDING TO MONTH AND DAY, OR LIKE, WILL BE PROCESSED ACCORDING TO SPECIFICATION (SUCH AS 2019/02/05, 2-5-2019, 2.5.2019) |
| 3 | DATE THAT DOES NOT EXIST | WHETHER LEAP DAY IN YEAR THAT IS NOT LEAP YEAR, LAST DAY OF MONTH THAT DOES NOT EXIST, OR LIKE, WILL BE PROCESSED ACCORDING TO SPECIFICATION (SUCH AS 2019/2/29, 2019/6/31) |
| 4 | OS COMMAND AND javascript | WHETHER OS COMMAND, javascript, OR LIKE, WILL NOT BE EXECUTED ACCIDENTALLY |
| 5 | ZERO, NEGATIVE NUMERICAL VALUE, SMALL NUMBER, AND ZERO PADDED VALUE | WHETHER IT WILL BE PROCESSED ACCORDING TO SPECIFICATION OF NUMERICAL ITEM |

Fig. 8

| | | PRESENCE OR ABSENCE OF DESIGNATION OF GENERATION CONDITION FOR TACIT KNOWLEDGE CATEGORY OF DICTIONARY | |
|---|---|---|---|
| | | PRESENT | ABSENT |
| PRESENCE OR ABSENCE OF DESIGNATION OF CONSTRAINT OF INPUT FIELD | PRESENT | GENERATE TEST DATA OF DICTIONARY ONLY WHEN CONSTRAINTS MATCH | GENERATE TEST DATA FOR CATEGORY OF DICTIONARY |
| | ABSENT | DO NOT GENERATE TEST DATA FOR CATEGORY OF DICTIONARY | GENERATE TEST DATA FOR CATEGORY OF DICTIONARY |

TEST DATA GENERATION APPARATUS, TEST DATA GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/045490, filed on 20 Nov. 2019, the disclosure of which is hereby incorporated herein by reference in its entirety.

TECHNICAL FIELD

The present disclosure relates to a technique for testing software.

BACKGROUND ART

Recently, in the field of software development, a development style such as releasing a plurality of new versions of software in a short period of time is increasing in order to satisfy ever varying consumer needs. Software development is released through the broad processes of "design", "implementation", and "test". Of these, the test process of confirming that the developed software can normally operate is a work including detecting failure of the software and correcting the failure before the release.

As one of test viewpoints in the test process, a function test is performed to confirm that a test target (a web application for example) operates as intended by a designer. The function test further includes several check viewpoints, including a test related to screen transition (hereinafter, referred to as a screen transition test) and a test on an input field on the screen (hereinafter, referred to as an input value variation test). In general, these tests take a vast amount of time.

The screen transition test is a test for checking whether a certain operation on a certain screen results in the next screen displayed as intended by the designer. The screen transition test takes time because operations related to all screen transitions of an application need to be comprehensively performed, meaning that a huge amount of manual operations are required including operations of clicking links and buttons and inputting data into input fields.

The input value variation test is a test for checking whether values input into the input field on the screen under various viewpoints result in actions and displaying of next screen as intended by the designer. The input value variation test takes time because it requires input of test data prepared under various viewpoints for the input fields on all the screens configuring the application.

The input value variation test includes a viewpoint based on an input value constraint (such as equivalence partitioning and boundary value analysis) as a specification base and a viewpoint based on tacit knowledge (error estimation) as an experience base. NPL 1 discloses an example of a test technique related to the tacit knowledge.

CITATION LIST

Non Patent Literature

NPL 1: Experience based testing technique (https://webrage.jp/techblog/testing_by_experience/), Internet, searched on Nov. 11 2019

SUMMARY OF THE INVENTION

Technical Problem

Test data based on tacit knowledge may be generated automatically by computers instead of being manually generated. However, the related-art technique has been unable to appropriately generate test data based on tacit knowledge.

The present disclosure has been made in view of the above circumstances, and an object of the present disclosure is to provide a technique of enabling appropriate generation of test data used for input value variation test based on tacit knowledge.

Means for Solving the Problem

The disclosed technique provides a test data generation device that generates test data to be input into an input field of a test target application that is a target of an input value variation test based on tacit knowledge, the test data generation device including
a storage unit that stores a tacit knowledge test data dictionary including, for each tacit knowledge category, a generation method, test data information, and an input value constraint of an input field to be used as a generation condition, and
a generation unit that refers to, regarding a certain tacit knowledge category for a target input field that is an input field for a test data generation target, the tacit knowledge test data dictionary to generate test data for the target input field when an input value constraint of the target input field in the test target application and an input value constraint of a generation condition regarding the tacit knowledge category are determined to match, and not to generate the test data for the target input field when the input value constraint of the target input field and the input value constraint of the generation condition regarding the tacit knowledge category are determined not to match.

Effects of the Invention

With the disclosed technique, a technique of enabling appropriate generation of test data used for input value variation test based on tacit knowledge is provided.

BRIEF DESCRIPTION OF DRAWINGS

FIG. 2 is a diagram illustrating an example of tacit knowledge in an input value variation test.

FIG. 8 is a diagram illustrating a test generation condition.

DESCRIPTION OF EMBODIMENTS

Hereinafter, embodiments of the present disclosure will be described with reference to the drawings. The embodiment to be described below is merely example, and an embodiment to which the present disclosure is applied is not limited to the following embodiment. While a web application is assumed to be the test target below, the possible application of the present disclosure is not limited to the case where the test target is a web application.

Example of System Configuration at Time of Test Execution

Figure 1:
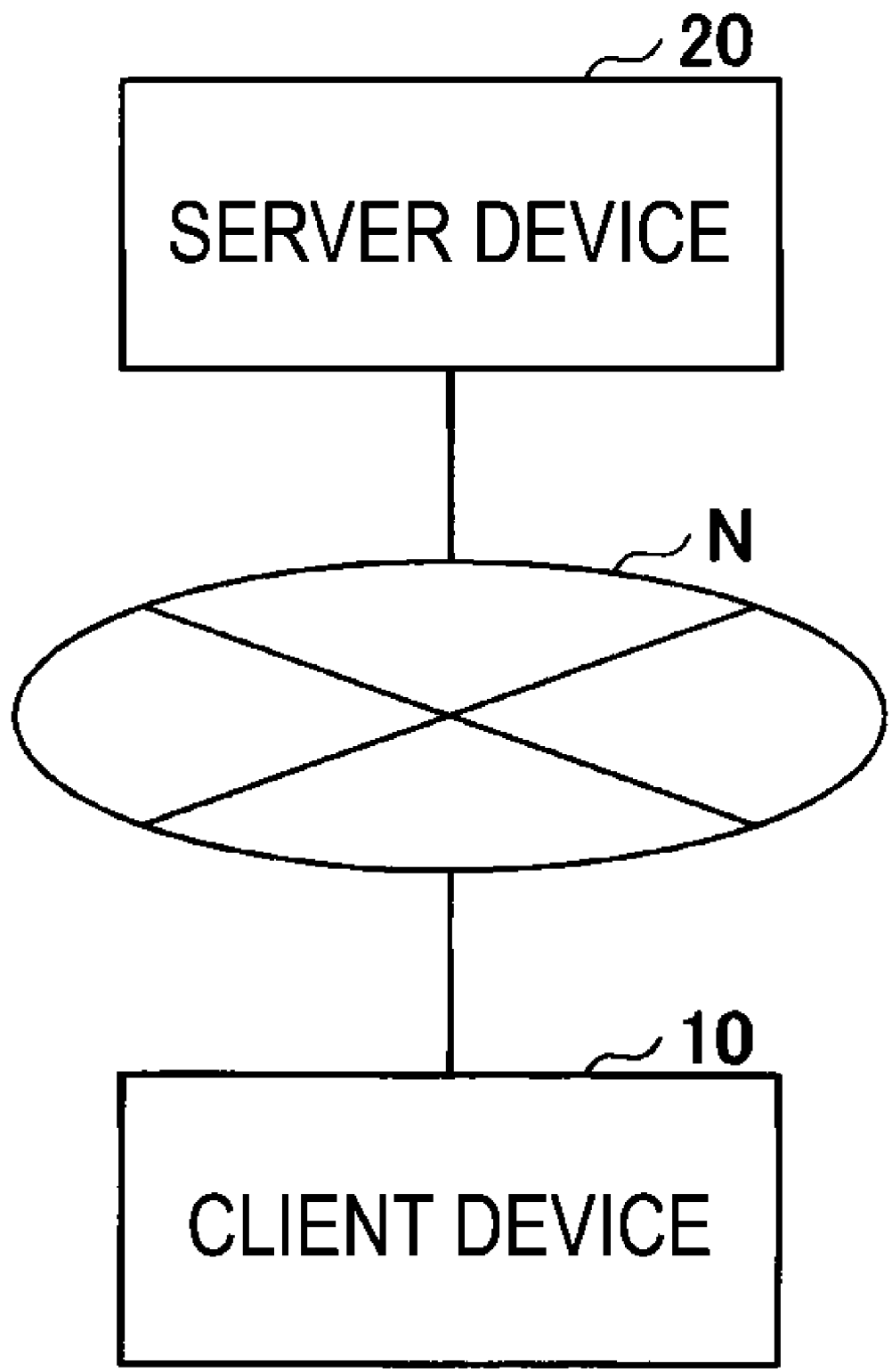
FIG. 1 is a diagram illustrating a configuration example of a system.

FIG. 1 is a diagram illustrating an example of a system configuration in a case where a test is performed using test data generated by a test data generation device 100 according to an embodiment of the present disclosure.

As illustrated in FIG. 1, the system includes a client device 10 and a server device 20. In addition, the client device 10 and the server device 20 are communicably connected through a network N such as a local area network (LAN) and the Internet, for example.

The server device 20 is a computer or a computer system that provides a web application. The web application provided by the server device 20 is software (application) to be tested.

The client device 10 is a device that executes a test on the web application provided by the server device 20. More specifically, for example, a test personnel accesses the web application from the client device 10, and inputs the test data, generated by the test data generation device 100, into an input field on a web screen, to check that no abnormal operation occurs. The input of the test data may be performed automatically by making the client device 10 execute a test code (which may also be referred to as a test script).

Note that while a personal computer (PC) or the like is used as the client device 10, this is not a limitation, and a smart phone, a tablet terminal, or the like may be used, for example. Hereinafter, the web application may simply be referred to as an "application".

About Problems

As described above, the input value variation test includes a viewpoint based on an input value constraint as a specification base and a viewpoint based on tacit knowledge (error estimation) as an experience base. Embodiment of the present disclosure is directed to the latter.

A description is given on an example of a test data generation method for performing the input value variation test based on tacit knowledge as well as a problem it has.

FIG. 2 illustrates an example of tacit knowledge in an input value variation test. As illustrated in FIG. 2, there is a check viewpoint for each tacit knowledge category.

For designing a test based on tacit knowledge in the input value variation test, for example, a test personnel generates, based on the tacit knowledge categories as illustrated in FIG. 2, test data for an input field on a screen of a test target application.

When the test data is generated, an effective test (test item and test data) needs to be generated based on an input value constraint of the input field. Thus, the test personnel needs to know the input value constraint of the input fields for all the screens, examine test items required for the input field, and generate, in order to check the check viewpoint, the test data to reach the processing parts affected by the test data, or to satisfy the input value constraint of the input field. Unfortunately, such manual test design requires a huge amount of man-hours.

Figure 3:
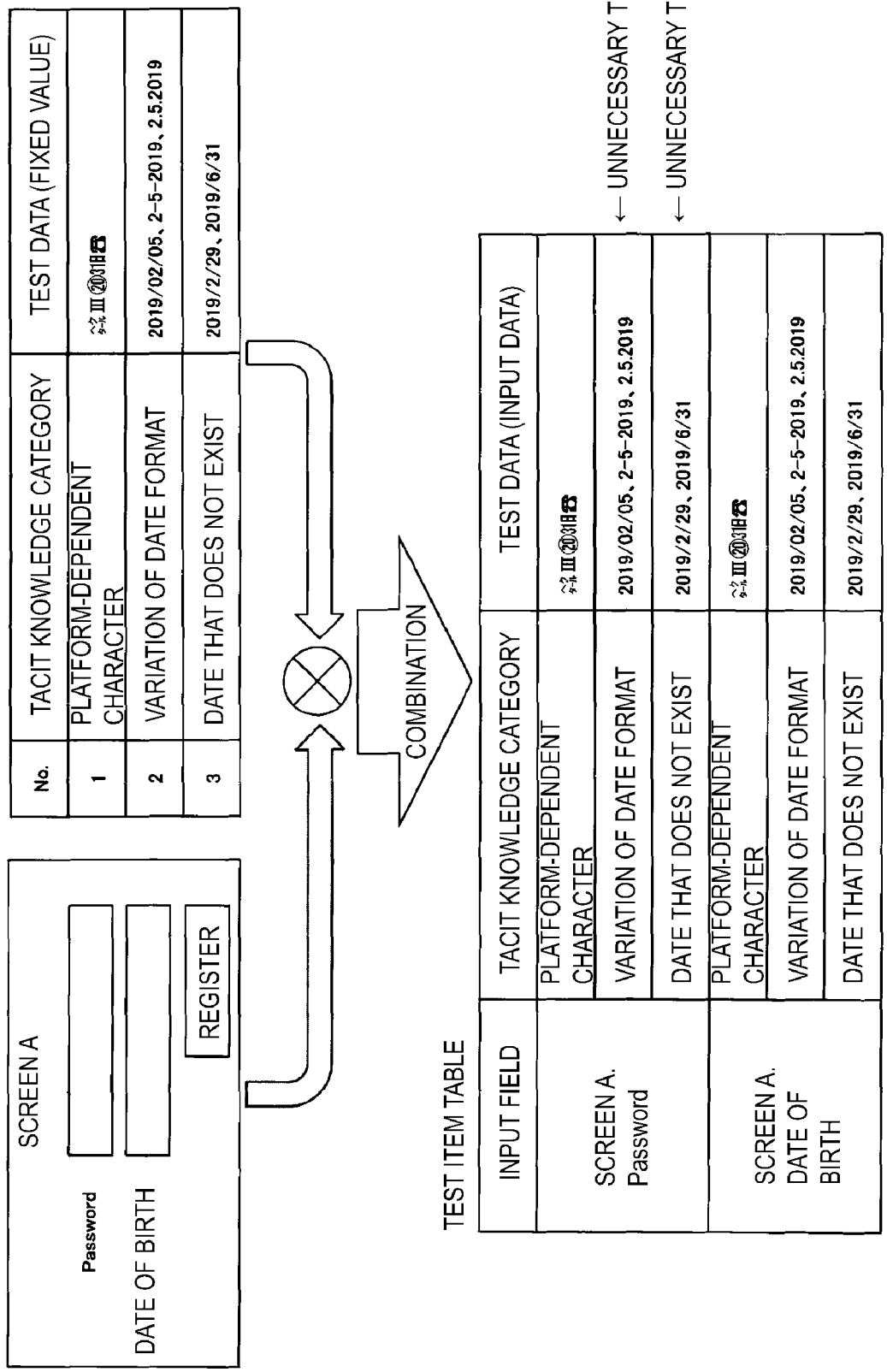
FIG. 3 is a diagram illustrating an example of generating test items through a simple combination.

The test items can also be automatically generated instead of involving manual operations. For example, as illustrated in FIG. 3, a test item can be generated by combining each input field on the screen of the test target application with test data based on tacit knowledge. However, this simple combination method does not take the input value constraint of the input field into consideration, and thus may result in unnecessary test items generated or a failure to generate test data suitable for the goal of the test.

A problem in the generation of test items through simple combination will be described with reference to FIG. 4. In the example illustrated in FIG. 4, a test item table 40 is generated by combining test data 30 (fixed value test data for each tacit knowledge category) based on tacit knowledge generated in advance with each input field of the test target application. The test item table 40 includes constraints on each input field. For example, a constraint on a password input field on a screen A is "8 characters or more and 16 characters or less".

Figure 4:
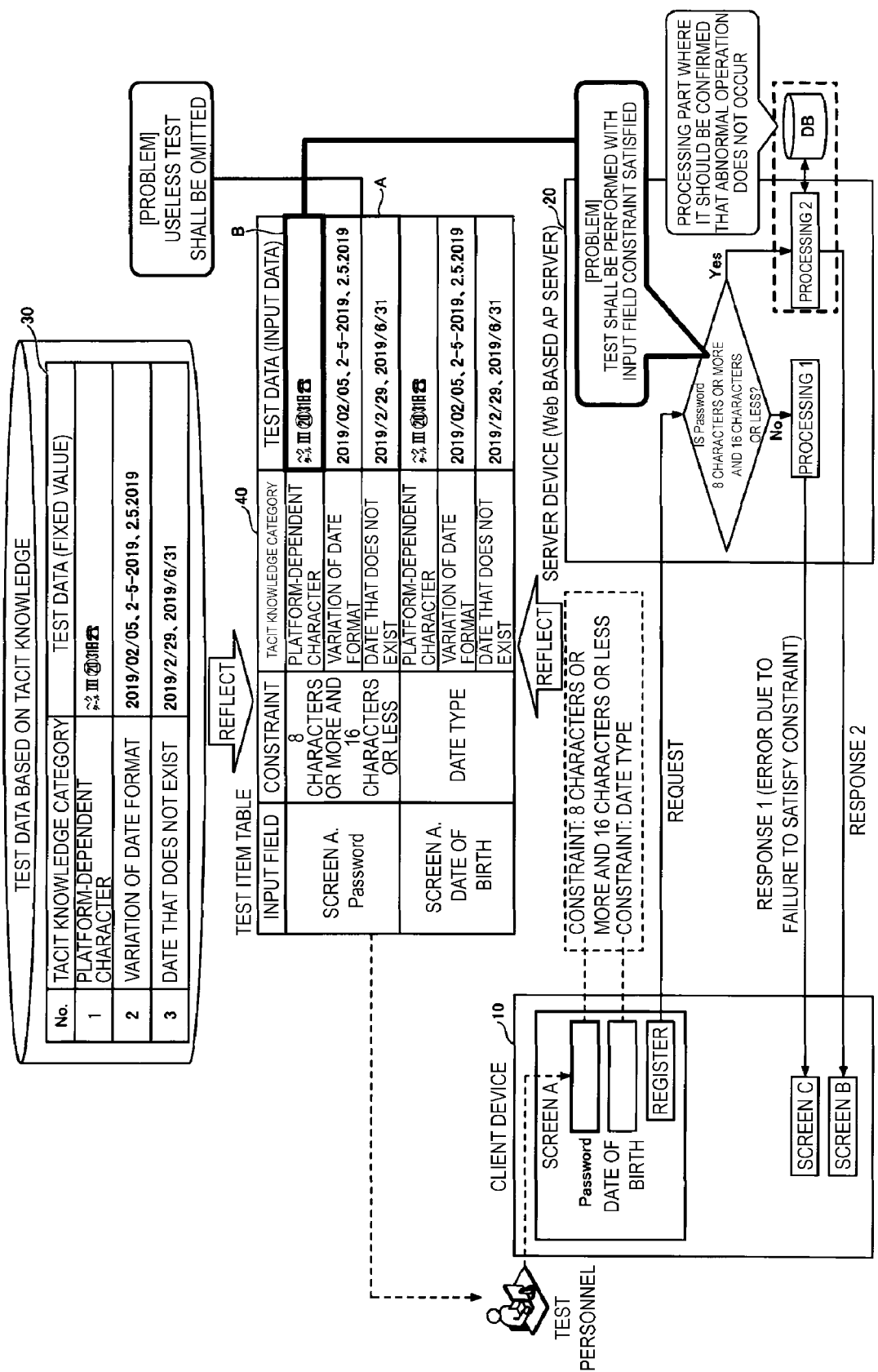
FIG. 4 is a diagram illustrating a problem in the generation of test items through the simple combination.

As illustrated in FIG. 4, the test personnel performs a test by inputting test data pieces No. 1 to No. 3 of the test data 30 in the password input field on the screen A, by referring to the test item table for example. However, as indicated in "A", the test data pieces No. 2 and No. 3 are test data for tacit knowledge test for date type input field (for example, date of birth), and thus no test using these pieces of data is required for non-date type input fields. In other words, a test using the test data pieces No. 2 and No. 3 on the password input field on the screen A is a useless test.

When an operation of processing 2 for a DB needs to be checked in the server device 20, to reach the processing 2, the test data needs to satisfy the constraint on the input field. However, with the test data (test data No. 1) indicated by "B" in FIG. 4, the processing 2 cannot be reached.

Thus, with a simple method of combining each input field on a screen of the test target application with test data based on tacit knowledge, test data used for the input value variation test based on tacit knowledge cannot be appropriately generated due to the following problems 1 and 2.

The problem 1 is that unnecessary test items (that is, unnecessary test data) are generated. As a viewpoint of the tacit knowledge, to confirm that no abnormal operation is performed in response to an input of "date that does not exist", it is not necessary to input the test data to a non-date type input field. However, as illustrated in FIG. 4, with the simple method, test data for confirming that no abnormal operation is performed in response to an input of "date that does not exist" is used as test data for the password input field. Thus, useless test is performed.

The problem 2 is that test data with which an intended test cannot be performed is generated. For example, when a character string length is designated as the input value constraint of the input field that is the test target and thus constraint needs to be satisfied to reach the processing part for which the impact of the test data is to be checked, test data satisfying the input value constraint on the input field needs to be prepared in advance. However, as illustrated in FIG. 4, with the simple method, such test data cannot be appropriately generated.

Description on Embodiment of the Present Disclosure

Overview

Hereinafter, a technique of an embodiment of the present disclosure for solving the problems described above will be described in detail. In the following, processing for solving the problem 1 and processing for solving the problem 2 will be described. Note that the processing for solving the problem 1 and the processing for solving the problem 2 may be executed independently. In the present embodiment, for the tacit knowledge check viewpoint, a required test is extracted and test data satisfying an input value constraint of an input field that is the test target is generated. Note that, in the present embodiment, "generation of test data" includes generating test data based on a regular expression or the like, as well as acquiring test data suitable for the target input field from a plurality of pieces of test data prepared in advance in a dictionary or the like. The overview is as described below.

In the present embodiment, a generation condition can be designated for a tacit knowledge category to generate required test data only, and thus it is intended to prevent execution of unnecessary tests. Furthermore, test data satisfying an input value constraint of an input field that is the test target is generated to implement an intended test. Note that the input value constraint of each input field on each screen of a test target application can be acquired in any manner. For example, it may be manually acquired or acquired through analysis on the test target application.

Configuration of Device

Figure 5:
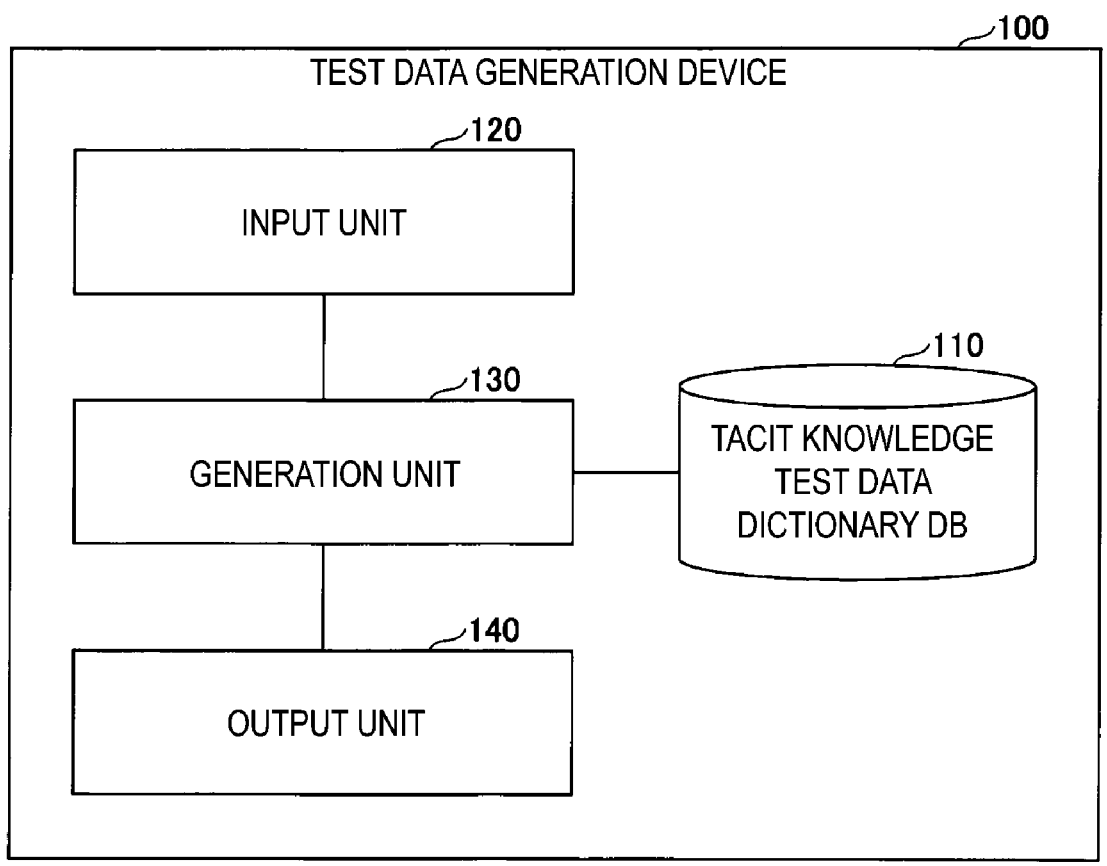
FIG. 5 is a diagram illustrating a configuration of a test data generation device of an embodiment of the present disclosure.

FIG. 5 is a diagram illustrating a configuration of a test data generation device 100 of the present embodiment. As illustrated in FIG. 5, the test data generation device 100 includes a tacit knowledge test data dictionary database (DB) 110, an input unit 120, a generation unit 130, and an output unit 140. Operations of each unit will be described in the section describing the operations below. Note that the test data generation device 100 may be the client device 10 illustrated in FIG. 1, or may be a device different from the client device 10. The tacit knowledge test data dictionary DB may also be referred to as a "storage unit".

For example, the test data generation device 100 can be implemented by causing a computer to execute a program describing details of processing contents explained in the present embodiment. Note that this "computer" may be a virtual machine. In a case where the virtual machine is used, "hardware" described herein refers to virtual hardware.

The test data generation device 100 can be implemented by executing a program corresponding to processing performed by the test data generation device 100 using hardware resources such as a CPU and a memory built into the computer. The program can be recorded on a computer-readable recording medium (a portable memory or the like) to be stored or distributed. The program can also be provided via a network such as the Internet or an electronic mail.

Figure 6:
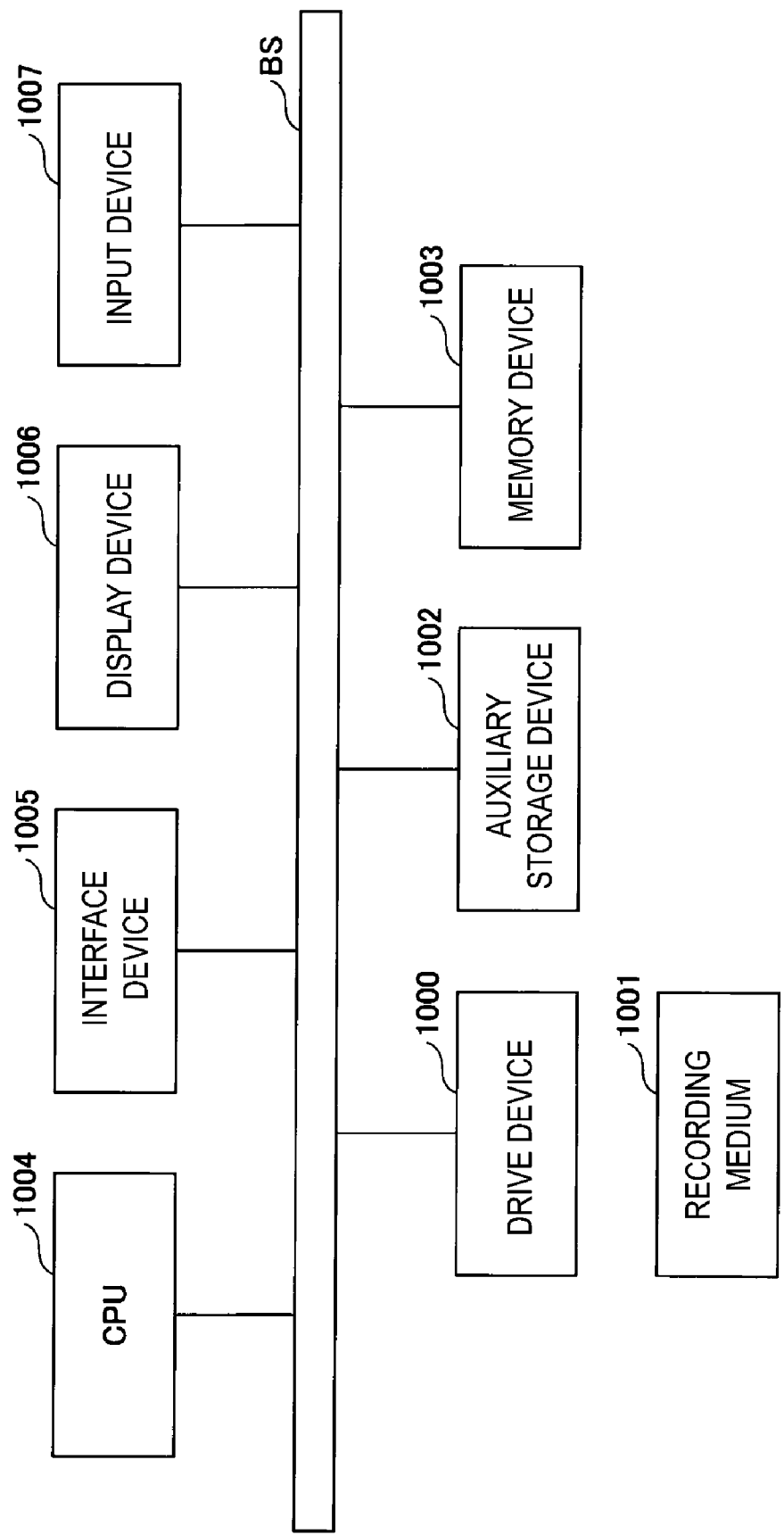
FIG. 6 is a diagram illustrating a hardware configuration of the device.

FIG. 6 is a diagram illustrating an example of a hardware configuration of the above-described computer. The computer in FIG. 6 includes a drive device 1000, an auxiliary storage device 1002, a memory device 1003, a CPU 1004, an interface device 1005, a display device 1006, an input device 1007, and the like connected to each other through a bus B.

A program for implementing processing in the computer is provided by, for example, a recording medium 1001 such as a CD-ROM or a memory card. When the recording medium 1001 that stores a program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program in a case where an instruction to start the program is given. The CPU 1004 implements a function relevant to the test data generation device 100 in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, or the like, and is used to input various operation instructions.

Overview of Operation of Test Data Generation Device 100

An overview of generation of test data executed by the test data generation device 100 will be described with reference to FIG. 7. First of all, the test personnel prepares a dictionary for the generating test data. This dictionary is referred to as a tacit knowledge test data dictionary. An example of the tacit knowledge test data dictionary is denoted by "50" in FIG. 7. The tacit knowledge test data dictionary 50 is stored in the tacit knowledge test data dictionary DB 110 of the test data generation device 100.

Figure 7:
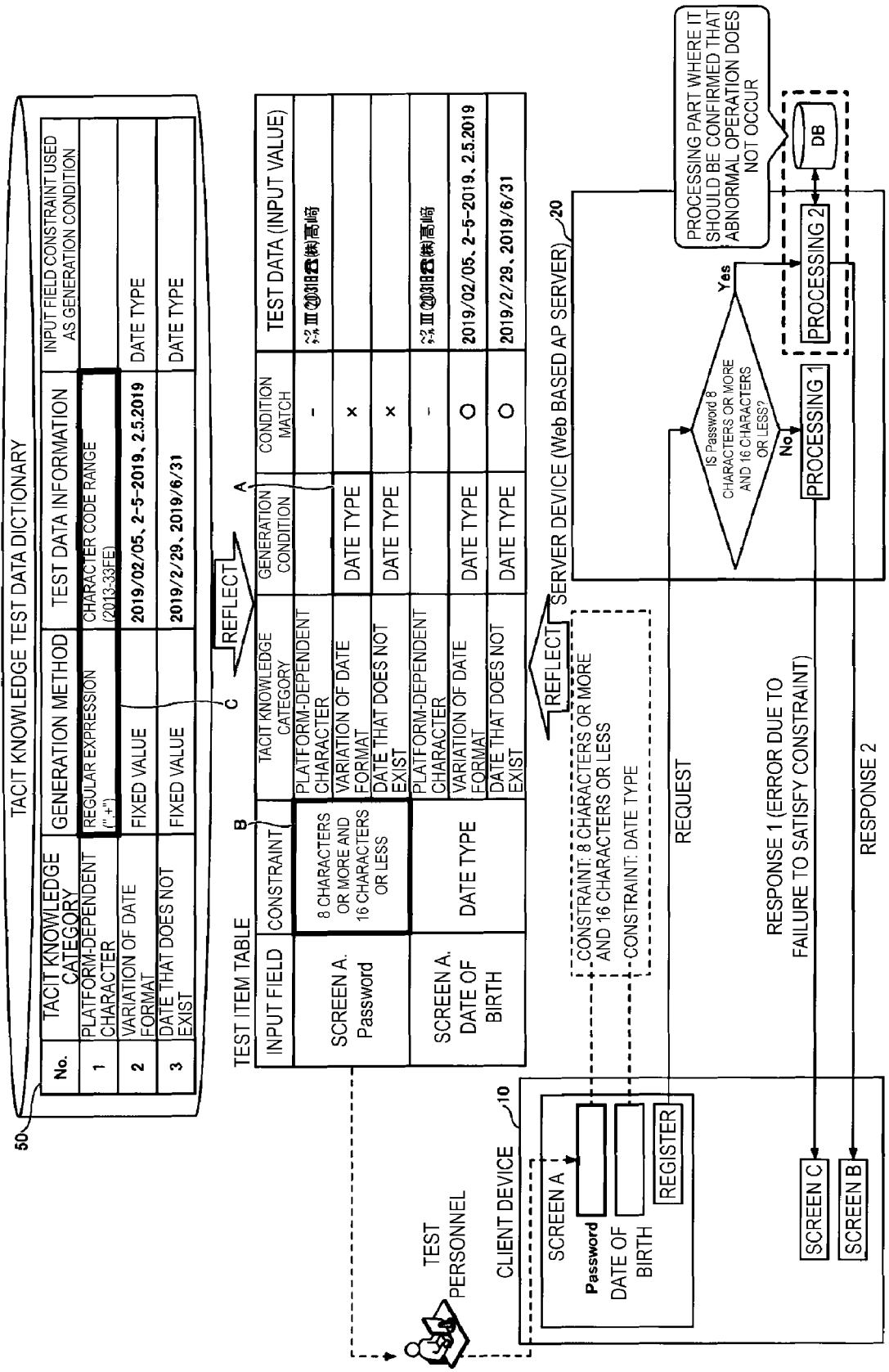
FIG. 7 is a diagram illustrating an overview of processing.

As illustrated in the tacit knowledge test data dictionary 50 of FIG. 7, the tacit knowledge test data dictionary 50 includes a tacit knowledge category, a generation method, test data information, and an input value constraint of an input field used as a generation condition of a test for the tacit knowledge category. The input value constraint of the input field used as the generation condition is not set for all the tacit knowledge categories. The generation condition may or may not be set depending on the content of the tacit knowledge category. Note that the "test data information" refers to information related to the generation method such as a character code range, a plurality of pieces of fixed test data, or the like, for example.

When generating test data for a certain tacit knowledge category for a certain input field, the generation unit 130 of the test data generation device 100 refers to the tacit knowledge test data dictionary DB 110, generates the test data when the input value constraint of the input field matches the input value constraint of the generation condition, and does not generate the test data when the input value constraint of the input field do not match the input value constraint of the generation condition, for the tacit knowledge category. This solves the problem 1 of generating unnecessary tests.

For example, in the example illustrated in FIG. 7, regarding the password input field on the screen A, the generation condition for the tacit knowledge category No. 2 (variation of date format) is "date type" (denoted by "A"). On the other hand, the input constraint is "8 characters or more and 16 characters or less" (denoted by "B") which does not match the generation condition. Thus, no test data is generated for the tacit knowledge category of this input field. In the example illustrated in FIG. 7, the test data of the tacit knowledge category of the input field is not included in the test item table. Thus, no test is performed for the tacit knowledge category of the input field. Thus, useless test can be omitted.

There are cases where both the generation condition in the tacit knowledge test data dictionary 50 and the input value constraint on the input field are present, cases where neither is present, and cases where either is present. FIG. 8 illustrates a relationship between generating or not generating a test depending on presence or absence of designation of the generation condition in the tacit knowledge test data dictionary 50 and designation of the input value constraint of the input field.

As illustrated in FIG. 8, in the case where there are both the generation condition and the input value constraint of the input field, test data is generated only when the constraints match as described above. If there is a generation condition and there is no input value constraint of the input field, test data is not generated for the tacit knowledge category (as in the case of mismatch). If there is no generation condition but there is an input value constraint of the input field, the test data is generated for the tacit knowledge category. If there are none of the generation condition nor the input value constraint of the input field, test data is generated for the tacit knowledge category.

As indicated by "C" in FIG. 7, a generation method is provided for the tacit knowledge test data dictionary 50, and the method based on regular expression can be designated in addition to the method using the fixed value as the generation method. Furthermore, a set of character code ranges to be generated as test data for the same can be designated.

For generating test data of a tacit knowledge category to which regular expression is applied for a certain input field, when the input value constraint is designated for the input field, the generation unit 130 of the test data generation device 100 automatically generates test data satisfying the constraint (test data satisfying "8 characters or more and 16 characters or less", for example) within the designated character code range, based on the regular expression.

Details of Operation of Test Data Generation Device 100

Next, details of the operation of the test data generation device 100 will be described based on flowcharts illustrated in FIGS. 9 and 10. A tacit knowledge test data dictionary is assumed to be stored in the tacit knowledge test data dictionary DB 110.

A test code and input value constraint information are input to the input unit 120. The test code is a code (which may be referred to as a script) to be a base (template) for generating variations of test data in the input value variation test.

More specifically, the test code to be input includes a code for reaching the test target screen, and a code for inputting the test data into a group of input fields on the screen reached and implementing a click operation on a button or the like resulting in transition to the next screen.

The test code may be generated manually or by using a reverse-based automated test script generation technique of restoring specification information by automatically operating a web application to be tested and automatically generating a test script from the restored specification information. An example of a reference document disclosing the automated test script generation technique includes Toshiyuki Kurabayashi, Muneyoshi Iyama, Hiroyuki Kirinuki, and Haruto Tanno, "Automatic Test Script Generation on GUI Testing", Software Engineering Symposium 2017 Papers pp. 260-264, September 2017.

The input value constraint information is an input value constraint on each input field of the test target application. The "date type" of the date of birth input field on the screen A illustrated in FIG. 7 is an example of the input value constraint. The input value constraint information may be acquired manually, or automatically extracted by a computer through analysis on the test target application and source code.

Figure 9:
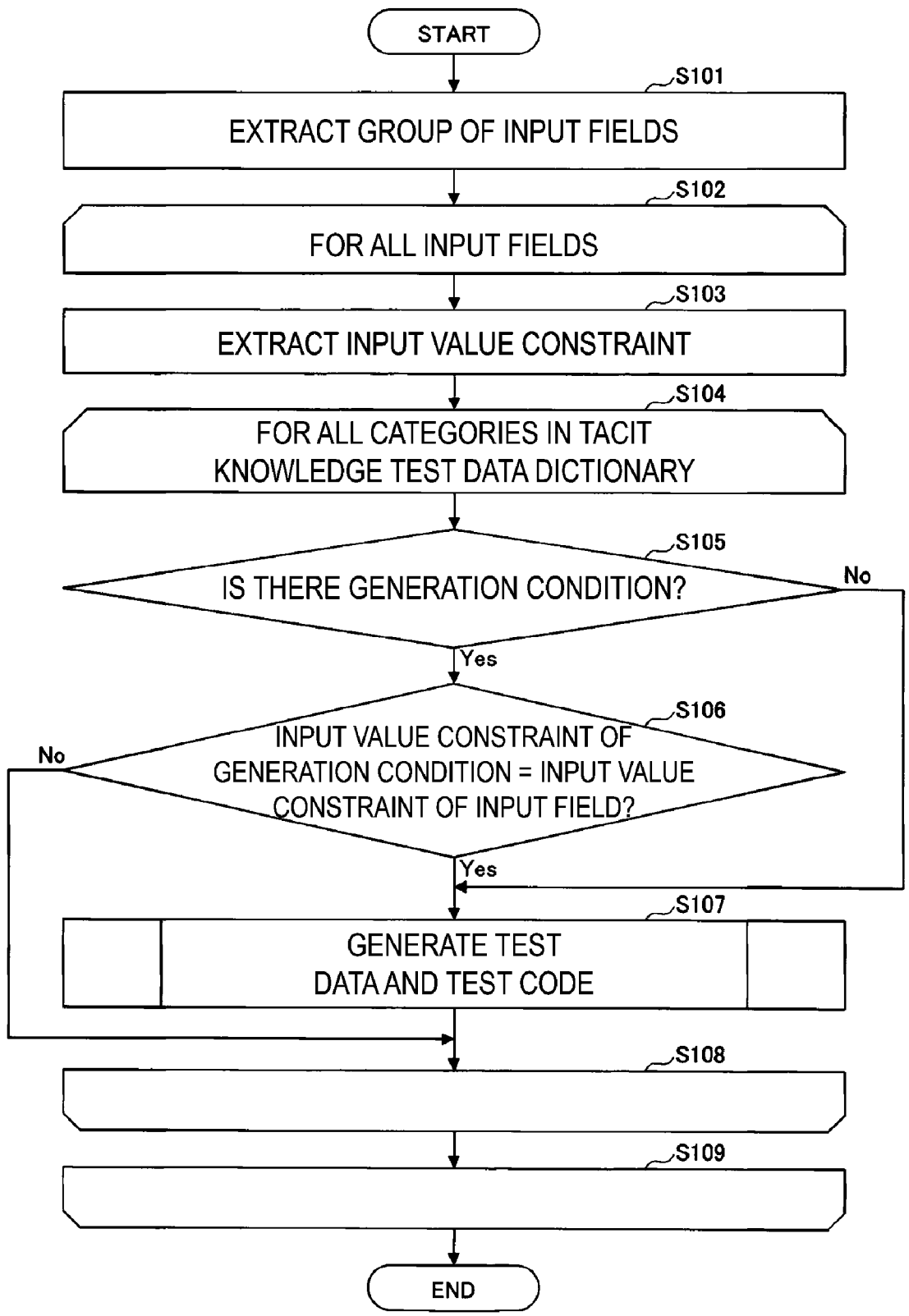
FIG. 9 is a flowchart illustrating a content of processing by the test data generation device.

In S101 in FIG. 9, the generation unit 130 extracts a group of input fields on the test target screen from the test code input. As illustrated in S102 and S109, the processing operations of S103 to S108 are executed on each of the group of input fields extracted.

In S103, the generation unit 130 extracts the input value constraint of the input field to be processed from the input value constraint information.

As illustrated in S104 and S108, the processing operations of S105 to S107 are executed on each of all tacit knowledge categories in the tacit knowledge test data dictionary for the target input field.

In S105, the generation unit 130 refers to the tacit knowledge test data dictionary DB 110 to determine whether there is a generation condition for the tacit knowledge category of interest. When a result of the determination in S105 is Yes (generation condition present), the processing proceeds to S106. When a result of the determination in S105 is No (generation condition absent), the processing proceeds to S107.

In S106, the generation unit 130 determines whether the input value constraint of the generation condition matches the input value constraint of the input field. When a result of the determination in S106 is No (mismatch), the processing proceeds to the next tacit knowledge category without generating the test data. When a result of the determination in S106 is Yes (match), the processing proceeds to S107, where the generation unit 130 generates test data and test code of the tacit knowledge category of interest for the input field of interest.

Figure 10:
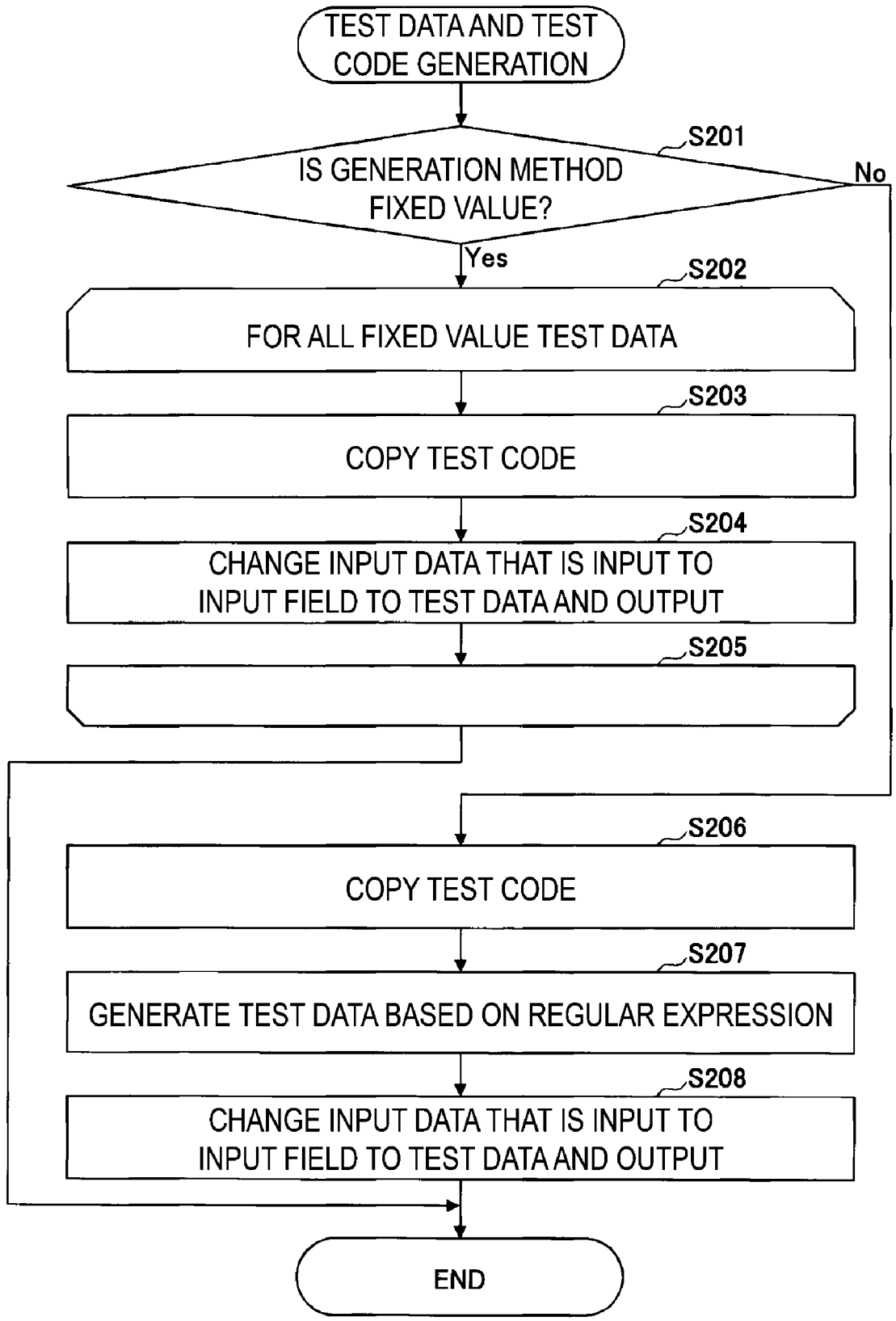
FIG. 10 is a flowchart illustrating a content of processing by the test data generation device.

FIG. 10 is a flowchart illustrating the processing in S107. In S201, the generation unit 130 refers to the tacit knowledge test data dictionary DB 110 to determine whether the generation method of the test data regarding the tacit knowledge category is a fixed value.

When a result of the determination in S201 is Yes (the generation method is a fixed value), the processing proceeds to S202. When a result of the determination in S201 is No (the generation method is not a fixed value), the processing proceeds to S206.

As illustrated in S202 and S205, S203 to S204 are executed on each of all the fixed value test data in the tacit knowledge category of interest.

In S203, the generation unit 130 copies the test code. This test code is a code to be a base (template) for generating variations of test data, as described above. The same applies to S206.

In S204, the generation unit 130 changes the data input into the input field in the test code copied In S203, to the test data of interest (test data of a fixed value), and passes the data to the output unit 140. The output unit 140 outputs the test code with the test data set.

In S206 to which the processing proceeds when the result of the determination in S201 is No (the generation method is not a fixed value), the generation unit 130 copies the test code.

In the present embodiment, when the generation method is not a fixed value, the generation method is assumed to be a regular expression. In S207, the generation unit 130 randomly uses characters of the character code range specified in the tacit knowledge test data dictionary to generate test data based on the regular expression, with the input value constraints of the input field of interest satisfied. Note that generating data based on the regular expression in this way is itself a known technique.

In S208, the generation unit 130 changes the data input into the input field in the copied test code to the test data generated in S207 and passes the data to the output unit 140. The output unit 140 outputs the test code with the test data set.

With the above processing, a test code with test data set as the input data is output for each input field and for each tacit knowledge category for which the test data is generated. For example, a test is implemented by executing the entire test code in which the output test codes are incorporated on the client device 10.

Note that in the example described above, the test code with test data set as input data is output, but this is merely an example. Instead of setting the generated test data to the test code, only the test data may be output, and a test may be performed with the test data manually input into the input field.

Furthermore, in the example illustrated in FIG. 7 above, the character string length is described as an example of the input value constraint of the input field for generating the test data satisfying the input value constraint of the input field. When there is an input value constraint designated in a range of numerical values (for example, age limit), the test data may be generated while taking the numerical range constraint into consideration.

Effects of Embodiment

As described above, in the present embodiment, an input value constraint is designated as generation condition of a test for a tacit knowledge category in the tacit knowledge test data dictionary, and the test data is generated when the input value constraint of the generation condition and the input value constraint of the input field match, when generating the test data.

In the present embodiment, the regular expression and range of character code to generate can be designated as a test data generation method for a tacit knowledge category in a tacit knowledge test data dictionary, and the test data is automatically generated to satisfy the input value constraint when an input value constraint is designated for an input field, when generating the test data.

With the technique described above, only appropriate test data based on a check viewpoint for a category can be generated without generating unnecessary test data, so that execution of useless test can be prevented. Furthermore, test data with which intended checking can be executed can be generated.

Summary of Embodiment

This specification describes at least a test data generation device, a test data generation method, and a program described in the following items.

Item 1
A test data generation device that generates test data to be input into an input field of a test target application that is a target of an input value variation test based on tacit knowledge, the test data generation device including
a storage unit that stores a tacit knowledge test data dictionary including, for each tacit knowledge category, a generation method, test data information, and an input value constraint of an input field to be used as a generation condition, and
a generation unit that refers to, regarding a certain tacit knowledge category for a target input field that is an input field for a test data generation target, the tacit knowledge test data dictionary to generate test data for the target input field when an input value constraint of the target input field in the test target application and an input value constraint of a generation condition regarding the tacit knowledge category are determined to match, and not to generate the test data for the target input field when the input value constraint of the target input field and the input value constraint of the generation condition regarding the tacit knowledge category are determined not to match.

Item 2
The test data generation device according to item 1, in which the generation unit generates the test data for the target input field when no generation condition for the tacit knowledge category is present in the tacit knowledge test data dictionary.

Item 3
A test data generation device that generates test data to be input into an input field of a test target application that is a target of an input value variation test based on tacit knowledge, the test data generation device including
a storage unit that stores a tacit knowledge test data dictionary including, for each tacit knowledge category, a generation method and test data information, and
a generation unit that refers to, regarding a certain tacit knowledge category for a target input field that is an input field for a test data generation target, the tacit knowledge test data dictionary to generate test data satisfying an input value constraint of the target input field based on a regular expression.

Item 4
The test data generation device according to item 3, in which the input value constraint is a character string length or a numerical value range.

Item 5
A test data generation method performed by a test data generation device that generates test data to be input into an input field of a test target application that is a target of an input value variation test based on tacit knowledge, the test data generation device including a storage unit that stores a tacit knowledge test data dictionary including, for each tacit knowledge category, a generation method, test data information, and an input value constraint of an input field to be used as a generation condition, the test data generation method including
referring to, regarding a certain tacit knowledge category for a target input field that is an input field for a test data generation target, the tacit knowledge test data dictionary to generate test data for the target input field when an input value constraint of the target input field in the test target application and an input value constraint of a generation condition regarding the tacit knowledge category are determined to match, and not to generate the test data for the target input field when the input value constraint of the target input field and the input value constraint of the generation condition regarding the tacit knowledge category are determined not to match.

Item 6
A program for causing a computer to operate as each of the units in the test data generation device according to any one of items 1 to 4.

Although the present embodiment has been described above, the present disclosure is not limited to such a specific embodiment, and various modifications and changes can be made within the scope of the gist of the present disclosure described in the aspects.

REFERENCE SIGNS LIST

10 Client device
20 Server device
100 Test data generation device
110 Tacit knowledge test data dictionary DB
120 Input unit
130 Generation unit
140 Output unit
1000 Drive device
1001 Recording medium
1002 Auxiliary storage device
1003 Memory device
1004 CPU
1005 Interface device
1006 Display device
1007 Input device

The invention claimed is:

1. A test data generation device comprising a storage device and a processor configured to execute a method comprising:
storing, in the storage device, a tacit knowledge test data dictionary including, for a tacit knowledge category, a generation process, test data information, and an input value constraint of an input field to be used as a generation condition; and
generating, for the tacit knowledge category for a target input field representing an input field for a test data generation target, by referring the tacit knowledge test data dictionary, test data for the target input field when an input value constraint of the target input field in a test target application matches with an input value constraint of the generation condition associated with the tacit knowledge category, except when the input value constraint of the target input field and the input value constraint of the generation condition associated with the tacit knowledge category do not match.

2. The test data generation device according to claim 1, wherein the generating further includes generating the test data for the target input field when no generation condition for the tacit knowledge category is present in the tacit knowledge test data dictionary.

3. The test data generation device according to claim 2, wherein the test data is associated with an input variation test of the test target application.

4. The test data generation device according to claim 2, wherein the matching of the input value constraint of the target input field in the test target application and the input value constraint of the generation condition associated with the tacit knowledge category is based at least on an input data type.

5. The test data generation device according to claim 2, wherein the generation process is based on a regular expression.

6. The test data generation device according to claim 1, wherein the test data is associated with an input variation test of the test target application.

7. The test data generation device according to claim 1, wherein the matching of the input value constraint of the target input field in the test target application and the input value constraint of the generation condition associated with the tacit knowledge category is based at least on an input data type.

8. The test data generation device according to claim 1, wherein the generation process is based on a regular expression.

9. A test data generation device comprising a storage device and a processor configured to execute a method comprising:
storing, in the storage device, a tacit knowledge test data dictionary including, in a tacit knowledge category, a generation process and test data information; and
generating, for the tacit knowledge category for a target input field representing an input field for a test data generation target, by referring to the tacit knowledge test data dictionary, test data satisfying an input value constraint of the target input field based on a regular expression.

10. The test data generation device according to claim 9, wherein the input value constraint includes a character string length or a numerical value range.

11. The test data generation device according to claim 10, wherein the test data is associated with an input variation test of a test target application.

12. The test data generation device according to claim 10, wherein the generation process is based on a regular expression.

13. The test data generation device according to claim 9, wherein the test data is associated with an input variation test of a test target application.

14. The test data generation device according to claim 9, wherein the generation process is based on a regular expression.

15. A computer-implemented method for generating test data, comprising:
storing a tacit knowledge test data dictionary including, in a tacit knowledge category, a generation process, test data information, and an input value constraint of an input field to be used as a generation condition; and
generating, for the tacit knowledge category for a target input field representing an input field for a test data generation target, by referring to the tacit knowledge test data dictionary, test data for the target input field when an input value constraint of the target input field in a test target application matches with an input value constraint of a generation condition associated with the tacit knowledge category, except when the input value constraint of the target input field and the input value constraint of the generation condition associated with the tacit knowledge category do not match.

16. The computer-implemented method according to claim 15, wherein the test data is associated with an input variation test of the test target application.

17. The computer-implemented method according to claim 15, wherein the matching of the input value constraint of the target input field in the test target application and the input value constraint of the generation condition associated with the tacit knowledge category is based at least on an input data type.

18. The computer-implemented method according to claim 15, wherein the generation process is based on a regular expression.

* * * * *